United States Patent [19]
Wakahara

[11] Patent Number: 5,518,469
[45] Date of Patent: May 21, 1996

[54] HYDRAULIC CIRCUIT FOR LOCK-UP DEVICE

[75] Inventor: Tatsuo Wakahara, Kawasaki, Japan

[73] Assignee: Nissan Motor Co., Ltd., Yokohama, Japan

[21] Appl. No.: 420,876

[22] Filed: Apr. 13, 1995

[30] Foreign Application Priority Data

Apr. 22, 1994 [JP] Japan ................................ 6-084525
Sep. 20, 1994 [JP] Japan ................................ 6-223880

[51] Int. Cl.$^6$ ................................ B60K 41/02
[52] U.S. Cl. ................................ 477/168; 477/158
[58] Field of Search ................................ 477/168, 158

[56] References Cited

U.S. PATENT DOCUMENTS

| | | | |
|---|---|---|---|
| 3,817,357 | 6/1974 | Mori et al. | 477/168 |
| 4,418,587 | 12/1983 | Kauffman | 477/158 |
| 4,506,564 | 3/1985 | Coutant | 477/158 |
| 4,552,036 | 11/1985 | Takano et al. | 477/158 |
| 4,662,493 | 5/1987 | Aoki et al. | 477/168 |
| 4,939,957 | 7/1990 | Asano et al. | 477/158 |
| 5,323,668 | 6/1994 | Nakagawa et al. | 477/158 |

*Primary Examiner*—Dirk Wright
*Attorney, Agent, or Firm*—Foley & Lardner

[57] ABSTRACT

A hydraulic circuit for a lock-up device includes a valve arranged in an oil path for supplying hydraulic pressure to a hydraulic power transmission. The valve regulates flows of hydraulic oil discharged toward a cooling circuit or a lubricating circuit, corresponding to a signal in relation to an engine torque. Therefore, corresponding to the engine torque, it is possible to maintain the hydraulic pressure for the hydraulic power transmission, which is necessary for lock-up condition of the lock-up device.

9 Claims, 6 Drawing Sheets

FIG. 2

| | | | R/C | H/C | F/C | O/C | B/B 2A | B/B 3R | B/B 4A | L&R/B | F/O | L/O |
|---|---|---|---|---|---|---|---|---|---|---|---|---|
| DRIVE RANGE | AT DRIVING | 1st. | | | ○ | | | | | | ○ | ○ |
| | | 2nd. | | | ○ | | ○ | ○ | | | ○ | |
| | | 3rd. | | ○ | ○ | | ○ | ○ | | | ○ | |
| | | 4th. | | ○ | (○) | | ○ | ○ | ○ | | | |
| | AT BRAKING | 1st. | | | (○) | ○ | | | | | | |
| | | 2nd. | | | (○) | ○ | ○ | ○ | | | | |
| | | 3rd. | | ○ | (○) | ○ | ○ | ○ | | | | |
| | | 4th. | | ○ | (○) | | ○ | | ○ | | | |
| RANGE 2 | | 1st. | | | ○ | | | | | | ○ | ○ |
| | | 2nd. | | | ○ | | ○ | ○ | | | ○ | |
| RANGE 1 | | 1st. | | | ○ | | | | | ○ | ○ | |
| BACK (RETROCESSION) | | | ○ | | | | | | | | ○ | |

NOTE ; (○) : NO RELATIONSHIP WITH POWER TRANSMISSION

HYDRAULIC CIRCUIT FOR LOCK-UP DEVICE

BACKGROUND OF THE INVENTION

The present invention relates to a hydraulic circuit for a lock-up device.

In Japanese Unexamined Patent Publication (Kokai) No. 61-105353, there is disclosed a conventional hydraulic circuit for the lock-up device, which includes a fluid coupling with a lock-up mechanism and which is used for an infinite variable-speed drive.

In the conventional circuit, the interior of the fluid coupling is divided into an "apply" chamber and a release chamber. In an inactivated state of the lock-up device, constant pressure adjusted by a coupling-pressure regulating valve is introduced into the apply chambers and the release chamber through a lock-up valve, so that the hydraulic pressures of the apply chamber and release chamber are maintained and are equal to each other.

In an activated state of the lock-up device, by changing the lock-up valve arranged in the hydraulic circuit and thereby connecting an oil path for supplying the hydraulic pressure into the release chamber with a drain, a rise of the pressure in the apply chamber in excess of the pressure in the release chamber allows a lock-up clutch to be joined for the lock-up state. Hereat, it is noted that the joint force of the lock-up clutch depends on a differential pressure between the pressure in the apply chamber and that in the release chamber.

In the middle of the oil path for supplying the hydraulic pressure to the apply chamber, another oil path is arranged to flow the hydraulic oil into the oil cooler. Provided in the middle of the oil path for flowing the oil into the oil cooler is a regulating valve which flows out the hydraulic oil for the oil cooler, when the hydraulic pressure in the apply chamber is more than a constant value. This regulating valve also serves to stop the flow out of the hydraulic oil for the oil cooler because there is a possibility that insufficient hydraulic pressure will be supplied for the apply chamber in case that a vehicle-speed is low and the discharging amount of the oil pump is small. The hydraulic oil cooled by the oil cooler is introduced into the lubricating circuit.

As mentioned above, the joint force of the lock-up clutch depends on the differential pressure between the hydraulic pressure in the apply chamber and the hydraulic pressure in the release chamber. Therefore, the hydraulic pressure of the apply chamber corresponding to the engine torque is necessary to execute such a lock-up.

However, because the hydraulic pressure in the apply chamber is maintained below the constant pressure by the regulating valve, it is impossible to supply the hydraulic pressure necessary for the lock-up required in a range of large engine torque. Further, there is caused a problem that, if increasing the constant pressure maintained by the regulating valve, the inflow to the oil cooler will be reduced, so that the hydraulic oil cannot be sufficiently cooldown and the oil for lubrication becomes insufficient.

SUMMARY OF THE INVENTION

It is therefore an object of the present invention to provide a hydraulic circuit for a lock-up device, which can improve not only a lock-up performance of the lock-up device but cooling and lubricating capacity of hydraulic oil used in the hydraulic circuit.

The objects of the invention described above can be accomplished by a hydraulic circuit for a lock-up device which can release an output side of a hydraulic power transmission from an input side thereof, mechanically and which can join the input side to the output side, mechanically. The lock-up device being connected to a cooling circuit for cooling hydraulic oil and a lubricating circuit for lubricating the hydraulic oil. The hydraulic power transmission transmitting rotating force input therein to an output side thereof by means of the hydraulic oil. The hydraulic circuit comprising:

an oil path for supplying hydraulic pressure to the hydraulic power transmission; and a valve arranged in the oil path to regulate flows of the hydraulic oil discharged toward the cooling circuit and/or the lubricating circuit, corresponding to a signal in relation to an engine torque.

With the above-mentioned arrangement, by arranging the valve for regulating the flows of the hydraulic oil discharged toward the cooling circuit or the lubricating circuit, corresponding to a signal in relation to the engine torque, in the oil path for supplying hydraulic pressure to the hydraulic power transmission, it is possible to maintain the hydraulic pressure for the hydraulic power transmission, which is necessary for a lock-up, corresponding to the engine torque, upon regulating the hydraulic oil flowing into the cooling circuit or the lubricating circuit.

In the present invention, preferably, the signal in relation to an engine torque is hydraulic pressure adjusted corresponding to a position of a throttle valve controlled by a driver. In such a case, it is possible to maintain the hydraulic pressure for the hydraulic power transmission, which is necessary for the lock-up, corresponding to hydraulic pressure adjusted corresponding to the position of throttle valve, namely, throttle position.

In the present invention, preferably, the valve includes a spool and a spring, both of which are inserted into a valve hole, the valve hole having a first port to which the hydraulic pressure adjusted corresponding to the position of the throttle valve is input, a second port connected to the oil path for supplying the hydraulic pressure to the hydraulic power transmission and a third port for discharging the hydraulic oil to the cooling circuit and/or the lubricating circuit;

wherein the hydraulic pressure adjusted corresponding to the position of the throttle valve and the force of the spring act on the spool in or a first direction; and wherein the hydraulic pressure supplied to the hydraulic power transmission acts on the spool in the other direction opposite of a second to the one direction thereby to discharge a part of the hydraulic oil supplied to the hydraulic power transmission into the cooling circuit and/or the lubricating circuit.

With the above-mentioned arrangement, the hydraulic pressure adjusted corresponding to the position of the throttle valve can be balanced with the force of the spring, whereby it is possible to maintain the hydraulic pressure for the hydraulic power transmission, which is necessary for the lock-up, corresponding to the engine torque. Therefore, it is possible to improve lock-up performance while improving cooling and lubricating capacity of the hydraulic oil.

Other objects and features of the present invention will become more fully apparent from the following description and appended claims taken in conjunction with the accompanying drawings.

BRIEF DESCRIPTION OF THE DRAWING

FIG. 2 is a diagram showing a relationship between various speed positions and operations of elements constituting the hydraulic circuit of the present invention;

DESCRIPTION OF THE PREFERRED EMBODIMENT

Embodiments of the present invention are described with reference to the drawings.

Figure 1:
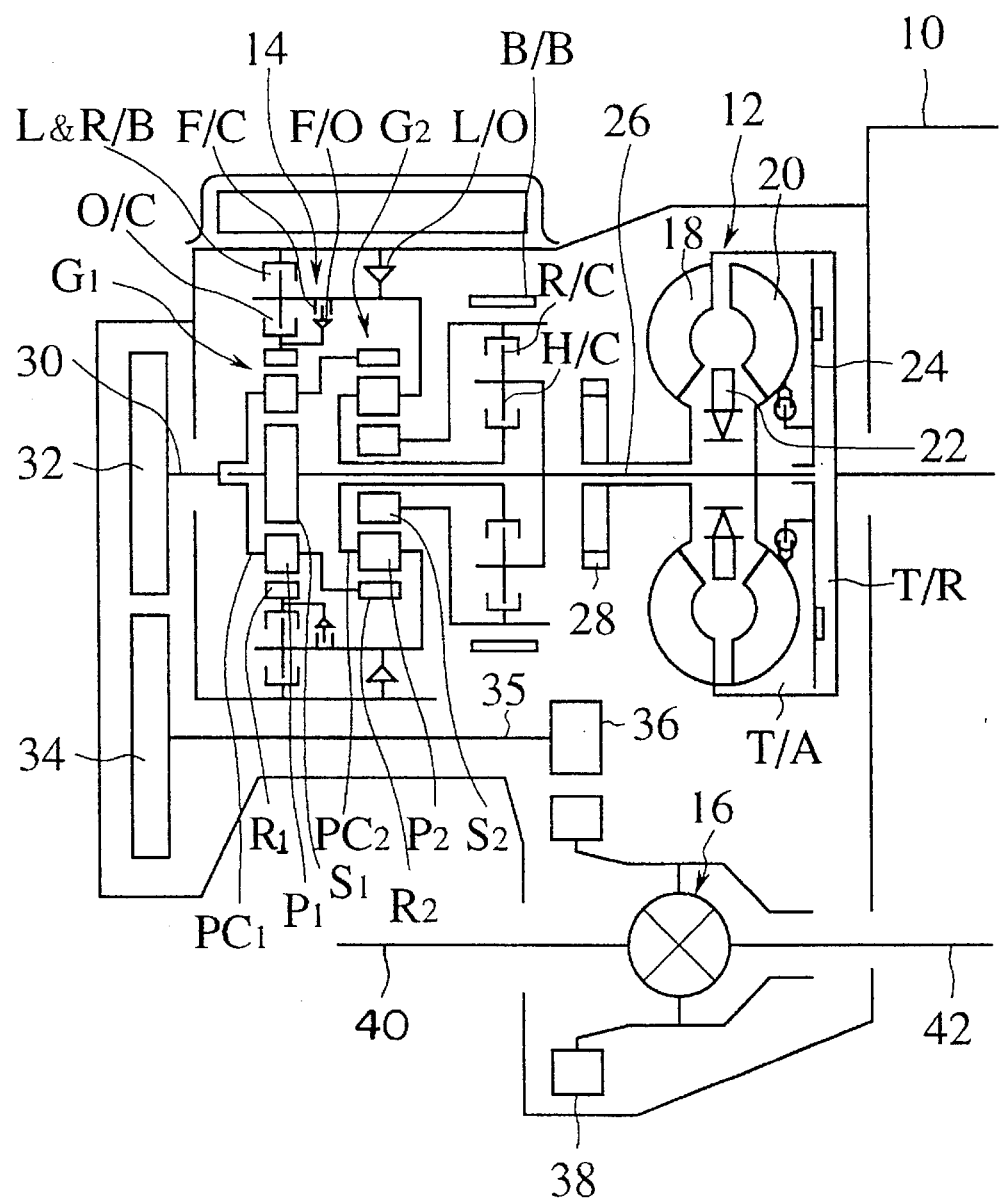
FIG. 1 is a view showing an automatic transmission equipped with a hydraulic circuit of the present invention.

FIG. 1 shows an automatic transmission equipped with a hydraulic circuit for a hydraulic power transmission in accordance with the first embodiment of the present invention. The automatic transmission associated with an engine 10 includes a torque converter 12 as the hydraulic power transmission, a planetary gear mechanism 14, and a differential mechanism 16. The torque converter 12 to which a rotation of the engine 10 is inputted has a pumping impeller 18 on an input side, a turbine runner 20 on an output side, a stator 22 and a lock-up clutch 24. The turbine runner 20 is connected with an input shaft 26. Under conditions when the lock-up clutch 24 is released, a rotational force is transmitted from the pumping impeller 18 to the input shaft 26 through the intermediary of fluid. On the other hand, when the lock-up clutch 24 is activated and joined, the pumping impeller 18 is mechanically joined to the turbine runner 20, so that the rotating force is mechanically inputted to the input shaft 26. The lock-up clutch 24 is driven by a differential pressure between an apply-chamber T/A and a release chamber T/R. The torque converter 12 is so constructed as to drive an oil pump 28.

The planetary gear mechanism 14 has a first planetary gear assembly G1 and a second planetary gear assembly G2. The first planetary gear assembly G1 consists of a first sun gear S1, a first internal gear R1, and a first pinion carrier PC1 to support a first pinion gear P1 which meshes with both gears S1 and R1 simultaneously. Similarly, the second planetary gear assembly G2 consists of a second sun gear S2, a second internal gear R2, and a second pinion carrier PC2 to support a second pinion gear P2 which meshes with both gears S2 and R2 simultaneously. The sun gear S1 is always connected with the input shaft 26. On the other hand, the first pinion carrier PC1 and the second internal gear R2 are always connected with the output shaft 30. The first internal gear R1 is capable of connecting with the second pinion carrier PC2 through the intermediary of a forward one-way clutch F/O and a forward clutch F/C both of which are arranged in series. The second sun gear S2 is capable of connecting with the input shaft 26 through a reverse clutch R/C and the second pinion carrier PC2 is capable of connecting with the input shaft 26 through a high clutch H/C. It is possible to fix the second sun gear S2 with a stable section by means of a band brake B/B, and it is also possible to fix the second pinion carrier PC2 with the stable section by means of a low one-way clutch L/O and a low and reverse brake L&R/B which are Juxtaposed to each other. An output gear 32 is provided integral with the output shaft 30.

Arranged in mesh with the output gear 32 is an idler gear 34 to which a reduction gear 36 is connected so as to rotate integrally with the idler gear 34 through an idler shaft 35. The reduction gear 36 is in mesh with a ring gear 38 of the differential mechanism 16. Driven shafts 40 and 42 are arranged to project from the differential mechanism 16 on left and right.

In the planetary gear mechanism 14, it is possible to change the rotating conditions of respective elements S1, S2, R1, R2, PC1 and PC2 by activating the clutches F/C, H/C, O/C, R/C and the brakes B/B and L&R/B in various combinations, whereby the rotating speed of the output shaft 30 with respect to the input shaft 26 can be changed variously. That is, by activating the above clutches and the brakes in the various combinations shown in FIG. 2, it is possible to attain four kinds of speeds in advance, i,e, the DRIVE RANGE, and a kind of speed in retrocession. In the figure, a mark of o designates a condition under which the clutch or the brake is joined and also shows an engagement condition in case of the one-way clutch. Further, 2A, 3R and 4A in a section of the band brake B/B designate a 2nd. speed apply chamber 2A, a 3rd. speed release chamber 3R, and a 4th. speed apply chamber 4A of a hydraulic servo unit for activating the band brake B/B, respectively. In this section, a mark of o designates a fact that hydraulics are supplied.

Figure 3:
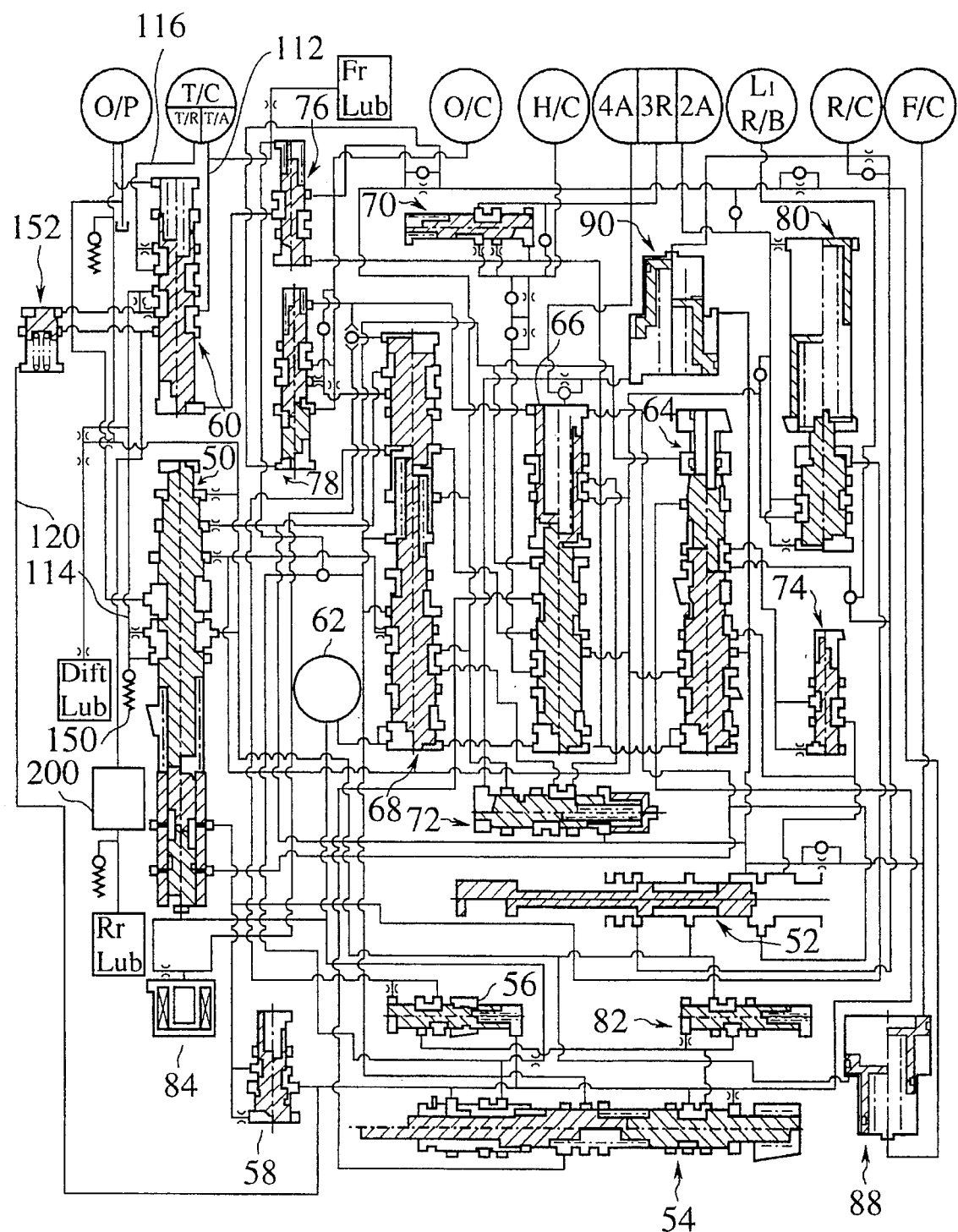
FIG. 3 is a view showing a hydraulic circuit in accordance with a first embodiment of the present invention.

FIG. 3 shows a hydraulic circuit of a hydraulic control device for an automatic transmission equipped with a hydraulic circuit for a hydraulic power transmission of the present invention.

The hydraulic control device has a pressure regulator valve 50, a manual valve 52, a throttle valve 54, a throttle modifier valve 56, a pressure modifier valve 58, a lock-up control valve 60, a governor valve 62, a 1-2 shift valve 64, a 2-3 shift valve 66, a 3-4 shift valve 68, a 3-2 timing valve 70, a 4-2 sequence valve 72, a 1st. speed fixed range pressure reducing valve 74, a speed cut valve 76, an over-run clutch control valve 78, a 1-2 accumulator valve 80, a kick-down modifier valve 82, an overdrive inhibitor solenoid 84, a N-D accumulator 88 and a servo release accumulator 90. These valves are connected to each other as shown in FIG. 3. In addition, an oil pump O/P, the apply chamber T/A and the release chamber T/R of the torque converter T/C 12, the clutches R/C, H/C, O/C and F/C and three chambers 2A, 3R and 4A of the band brake B/B are connected as shown in the figure. With the above-mentioned arrangement, corresponding to vehicle speed and throttle position of an engine, the clutches R/C, H/C, O/C and F/C and the band brake B/B operate as shown in FIG. 2, whereby the speed change of vehicle can be attained. A detailed description of the complete hydraulic control circuit has been omitted for clarity. Only the portions of the hydraulic control circuit relevant to the present invention have been described below with reference to FIG. 4.

Figure 4:
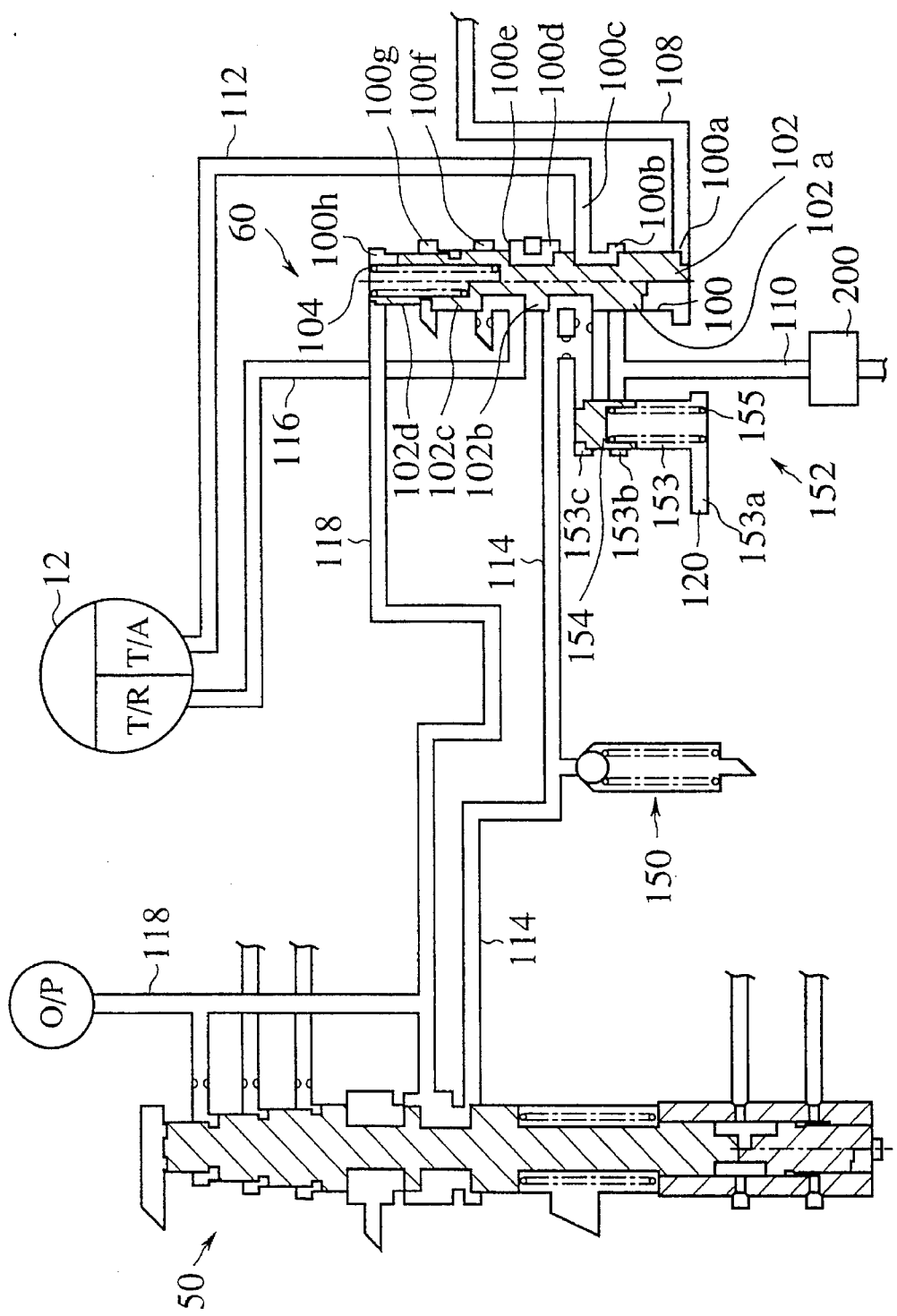
FIG. 4 is a partial view of FIG. 3, showing an essential part of the hydraulic circuit in accordance with the first embodiment of the present invention.

As shown in the figure, the lock-up control valve 60 consists of a spool 102 inserted into a valve hole 100, and a spring 104 for urging the spool 102 downward in the figure. The valve hole 100 is provided with ports 100a–100h. The spool 102 has a plurality of lands 102a–102d. Among them, the lands 102a, 102b and 102c have diameters equal to each other and the land 102d has a diameter smaller than that of the other lands 102a–102c. The positional relationship between the respective lands and the ports are established as shown in FIG. 4. The port 100a is connected to an oil path 108 to which a lock-up signal pressure is applied. The port 100b is connected to an oil path 110 for cooling and lubricating. The port 100e is connected to an oil path 116 which is also in communication with the release chamber T/R inside the torque converter 12. Both ports 100f and 100g are opened for drainage. The port 100h is connected to an oil path 118 to which line pressure from the pressure regulator valve 50 is introduced. Note that, a relationship among an area presented to the pressure of the land 102a of the spool 102, an area presented to the pressure of the land 102d and force of the spring 104 is established as follows. That is, when the line pressure is applied to the port 100a, the position of the spool 102 is changed to a condition as shown in a left-hand half-section in the figure, namely, a joined lock-up clutch condition. In other cases besides the above condition, the spool 102 is under a condition shown in the right-hand half-section in the figure, namely, a released lock-up clutch condition.

The pressure regulator valve 50 has a function to regulate the hydraulic pressure in the oil path 118 into which discharge oil is supplied from the oil pump O/P, discharging some oil to the oil path 114 in regulating the hydraulic pressure. In the oil path 114, a first relief valve 150 is arranged to keep the hydraulic pressure in the path 114 below a constant value.

A second relief valve 152 is constituted by a spool 154 inserted into a valve hole 153 and a spring 155 for urging the spool 154 upward in the figure. The valve hole 153 is provided with ports 153a~153c. The relationship in position between the spool 154 and the respective ports 153a~153c is established as shown in the figure. The port 153a is connected to the oil path 120 to which throttle pressure, which is a signal in relation to the engine torque, is supplied corresponding to the throttle position. The port 153b is connected to the oil path 110 for flowing hydraulic oil into an oil cooler 200. The port 153c is connected to the oil paths 114 and 112 through orifices.

The above-mentioned circuit operates as follows.

When it is ordered to release the lock-up clutch 24, the lock-up signal pressure of the oil path 108 will get zero. Thus, the spool 102 of the lock-up control valve 60 is urged by the spring 104 and brought into the condition of the shown right-hand half-section in FIG. 4, so that the port 100e is communicated with the port 100d and the port 100c is communicated with the port 100b. Consequently, the oil path 114 is connected to the oil path 116 and similarly, the oil path 112 is connected to the oil path 110. Therefore, torque converter supply pressure, which has been supplied from the pressure regulator valve 50 to the oil path 114, is introduced to the release chamber T/R of the torque converter 12 through the oil path 116. On the other hand, the hydraulic pressure in the apply chamber T/A of the torque converter 12 is discharged into the oil cooler 200 through the oil paths 112 and 110. Thus, in the torque converter 12, the hydraulic oil flows from the release chamber T/R to the apply chamber T/A, whereby the lock-up clutch 24 is released. Further, the hydraulic oil is discharged into the oil cooler 200 through the port 100 and oil path 110.

Next, when it is ordered to join and activate the lock-up clutch 24, the lock-up signal pressure is supplied into the oil path 108. Thus, the spool 102 of the lock-up control valve 60 is changed into the condition of the shown left-hand half-section, opposing to the force of the spring 104. Consequently, the port 100d communicates with the port 100c and the port 100e communicates with the port 100f. That is, the oil path 114 communicates with the oil path 112 and on the other hand, the oil path 116 communicates with the port 100f, which is open for drainage. Therefore, the torque converter supply pressure of the oil path 114 is introduced to the apply chamber T/A through the oil path 112. On the other hand, the hydraulic pressure in the release chamber T/R is discharged from the port 100f, which is open for drainage. Thus, the lock-up clutch 24 is pressed by the hydraulic pressure in the apply chamber T/A, whereby the clutch 24 is joined. Then, the hydraulic pressure is introduced to the apply chamber T/A through the oil paths 114 and 112 and the hydraulic pressure in the torque converter 12 is maintained to a constant value to be determined by the first relief valve 150 arranged in the oil path 114.

The throttle pressure is introduced into the second relief valve 152 through the port 153a and therefore, it becomes to be a force for urging the spool 154 upward as shown in FIG. 4 in the figure. On the other hand, downward force is applied on the spool 154 from the oil path 114 through the port 153c. When the spool 154 is depressed by the force, opposing to the throttle pressure and the force of the spring 155, the hydraulic oil in the oil path 114 is discharged from the port 153b into the cooler 200.

In this way, the second relief valve 152 operates to regulate the hydraulic pressure inside the torque converter 12, regulating the hydraulic flow into the oil cooler 200 corresponding to the throttle pressure which is proportional to the engine torque. Consequently, when the engine torque is so high that the hydraulic pressure required for lock-up becomes large, a flow of the hydraulic oil into the oil cooler 200 is decreased so that there is an increase the hydraulic pressure inside the torque converter 12, whereby the lock-up performance can be ensured. On the contrary, when the engine torque is so low that the hydraulic pressure required for lock-up becomes small, a flow of the hydraulic oil into the oil cooler 200 is increased to cool the hydraulic oil.

The second embodiment of the present invention will be described below. It is noted that the brief structure of the automatic transmission in accordance with the second embodiment is similar to that of the first embodiment shown in FIG. 1.

Figure 5:
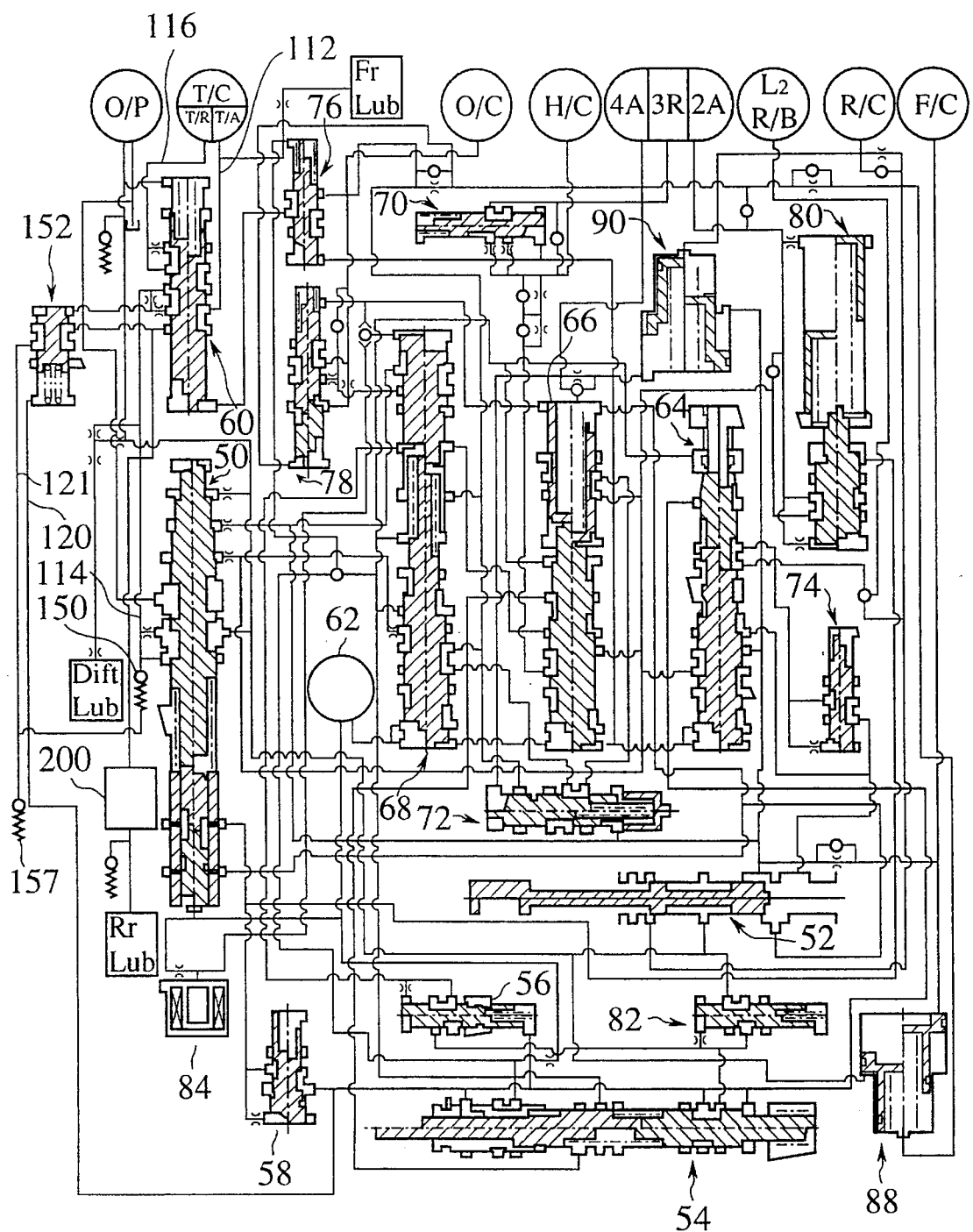
FIG. 5 is a view showing a hydraulic circuit in accordance with a second embodiment of the present invention.

FIG. 5 shows a hydraulic circuit of a hydraulic control device for an automatic transmission equipped with a hydraulic circuit for a hydraulic power transmission of the present invention. Note, in this embodiment, elements similar to those in the first embodiment are indicated with the same reference numerals, respectively.

The hydraulic control device has the pressure regulator valve 50, the manual valve 52, the throttle valve 54, the throttle modifier valve 56, the pressure modifier valve 58, the lock-up control valve 60, the governor valve 62, the 1-2 shift valve 64, the 2-3 shift valve 66, the 3-4 shift valve 68, the 3-2 timing valve 70, the 4-2 sequence valve 72, the 1st. speed fixed range pressure reducing valve 74, the speed cut valve 76, the over-run clutch control valve 78, the 1-2 accumulator valve 80, the kick-down modifier valve 82, the overdrive inhibitor solenoid 84, the N-D accumulator 88 and the servo release accumulator 90. These valves are connected to each other as shown in FIG. 3. In addition, the oil pump O/P, the apply chamber T/A and the release chamber T/R of the torque converter (T/C) 12, the clutches R/C, H/C, O/C and F/C and three chambers 2A, 3R and 4A of the band brake B/B are connected as shown in the figure. With the above-mentioned arrangement, corresponding to vehicle speed and the throttle position of the engine, the clutches R/C, H/C, O/C and F/C and the band brake B/B operate as shown in FIG. 2, whereby the speed change of vehicle can be attained. Again, regarding other portions besides portions to which the present invention directly relates, we eliminate the detailed descriptions.

Figure 6:
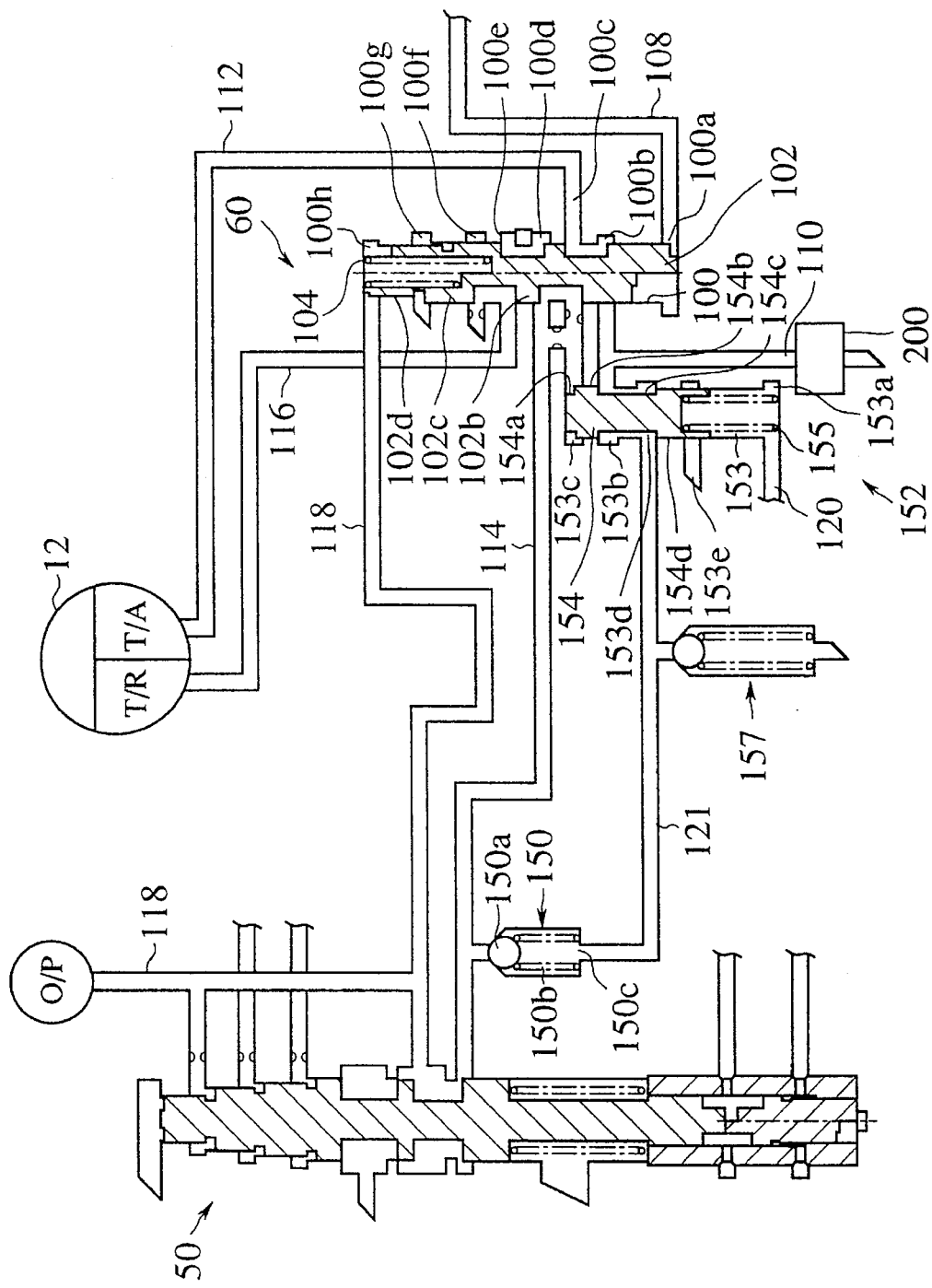
FIG. 6 is a partial view of FIG. 5, showing an essential part of the hydraulic circuit in accordance with the second embodiment of the present invention.

We now describe the hydraulic circuit of the invention, with reference to FIG. 6 where portions in relation to the present invention are shown.

Also in the figure, the lock-up control valve 60 consists of the spool 102 inserted into the valve hole 100 and the spring 104 for urging the spool 102 downward in the figure. The valve hole 100 is provided with the ports 100a~100h. The spool 102 has the lands 102a~102d. Among them, the lands 102a, 102b and 102c have diameters equal to each other and the land 102d has a diameter smaller than that of the land 102a. The positional relationship between the respective lands and the ports are established as shown in the figure. The port 100a is connected to the oil path 108 to which the lock-up signal pressure is applied. The port 100b is connected to the oil path 110 for cooling and lubricating. The port 100e is connected to the oil path 116 which is also communicated with the release chamber T/R inside the torque converter 12. Both ports 100f and 100g are opened for drainage. The port 100h is connected to the oil path 118 to which line pressure from the pressure regulator valve 50 is introduced. Note that, a relationship among the area presented to the pressure of the land 102a of the spool 102, the area presented to the pressure of the land 102d and the force of the spring 104 is established as follows. That is, when the line pressure is applied to the port 100a, the position of the spool 102 is changed to a condition as shown in a left-hand half-section in the figure, namely, the joined lock-up clutch condition. In other cases, besides the above condition, the spool 102 is in a condition as shown in a right-hand half-section of FIG. 6, namely, the released lock-up clutch condition.

The pressure regulator valve 50 has a function to regulate the hydraulic pressure in the oil path 118 into which discharge oil is supplied from the oil pump O/P, discharging some oil to the oil path 114 in regulating the hydraulic pressure. In the oil path 114, the first relief valve 150 is arranged to keep the hydraulic pressure in the path 114 below a constant value.

The first relief valve 150 is constituted by a ball 150a, a spring 150b for urging the ball 150a upward in the figure and a drain port 150c connected to the oil path 121. In the oil path 121, a third relief valve 157 is arranged to keep the hydraulic pressure in the path 121 below a constant value.

The second relief valve 152 is constituted by the spool 154 inserted into the valve hole 153 and the spring 155 for urging the spool 154 upward in the figure. The valve hole 153 is provided with the ports 153a~153c. The relationship in position between the spool 154 and the respective ports 153a~153c is established as shown in the figure. The port 153a is connected to the oil path 120 to which the throttle pressure, which is a signal proportional to the engine torque, is supplied corresponding to the throttle position. The port 153b is connected to the oil path 110 for flowing hydraulic oil into the oil cooler 200. The port 153c is connected to the oil paths 114 and 112 through orifices. The port 153d is connected to the oil path 121. The port 153e is opened for drainage.

The spool 154 is constituted by small diametrical sections 154a and 154c and large diametrical sections 154b and 154d. When the spool 154 exists on the upside of the valve hole 153 in the figure, the port 153b is communicated with the port 153d by the small diametrical section 154c. On the other hand, when the spool 154 exists on the downside of the figure, the port 153d is communicated with the port 153e by the small diametrical section 154c.

The above-mentioned circuit operates as follows.

When it is ordered to release the lock-up clutch 24, the lock-up signal pressure of the oil path 108 will become zero. Thus, the spool 102 of the lock-up control valve 60 is urged by the spring 104 and brought into the condition of the shown right-hand half-section in the figure, so that the port 100e is communicated with the port 100d and the port 100c is communicated with the port 100b. Consequently, the oil path 114 is connected to the oil path 116 and similarly, the oil path 112 is connected to the oil path 110. Therefore, torque converter supply pressure, which has been supplied from the pressure regulator valve 50 to the oil path 114, is introduced to the release chamber T/R of the torque converter 12 through the oil path 116. On the other hand, the hydraulic pressure in the apply chamber T/A of the torque converter 12 is discharged into the oil cooler 200 through the oil paths 112 and 110. Thus, in the torque converter 12, the hydraulic oil flows from the release chamber T/R to the apply chamber T/A, whereby the lock-up clutch 24 is released. Further, the hydraulic oil is discharged into the oil cooler 200 and a lubricating circuit through the port 100 and oil path 110.

Next, when it is ordered to join and activate the lock-up clutch 24, the lock-up signal pressure is supplied into the oil path 108. Thus, the spool 102 of the lock-up control valve 60 is changed into the condition as shown in the left-hand half-section of the section, opposing to the force of the spring 104. Consequently, the port 100d communicates with the port 100c and the port 100e communicates with the port 100f. That is, the oil path 114 communicates with the oil path 112, and on the other hand, the oil path 116 communicates with the port 100f, which is line 8 for drainage. Therefore, the torque converter supply pressure of the oil path 114 is introduced to the apply chamber T/A through the oil path 112. On the other hand, the hydraulic pressure in the release chamber T/R is discharged from the port 100f for drainage. Thus, the lock-up clutch 24 is pressed by the hydraulic pressure in the apply chamber T/A, whereby the clutch 24 is joined. Then, the hydraulic pressure is introduced to the apply chamber T/A through the oil paths 114 and 112 and the hydraulic pressure in the torque converter 12 is maintained to a constant value determined by the first relief valve 150 arranged in the oil path 114.

In the first relief valve 150, the hydraulic pressure inside the oil path 114 serves to urge the ball 150a downward in the figure. When this downward force is more than the force of the spring 150b, the ball 150a is depressed downward in the figure. Then, the valve 150 operates to keep the hydraulic pressure in the oil path 114 below a constant value by discharging the oil in the oil path 114 from the drain port 150c.

The throttle pressure is introduced into the second relief valve 152 through the port 153a and therefore, the throttle pressure becomes a force for urging the spool 154 upward in the figure. On the other hand, downward force is applied on the spool 154 from the oil path 114 through the port 153c. When the spool 154 is depressed by the force applied from oil path 114, opposing to the throttle pressure and the force of the spring 155, the hydraulic oil in the oil path 114 is discharged from the port 153b into the oil cooler 200.

If the spool 154 is stuck on the upside of the valve hole 153 by alien substances, etc. and it is impossible to depress the spool 154 downward by only hydraulic pressure, the hydraulic oil discharged from the relief port 150c of the first relief valve 150 flows into the oil cooler 200 and the lubricating circuit because the port 153b communicates with the port 153d through the small diametrical section 154c of the spool 154. Hereat, even if the alien substances intrude into the oil cooler 200 and the lubricating circuit thereby to increase the hydraulic pressure in the oil path 110, the hydraulic pressure in the oil path 121 can be maintained below the constant value due to the third relief valve 157, so that the activation of the first relief valve 150 is not influenced at all.

Further, also in case that the spool 154 of the second relief valve is pressed downward in the figure, the activation of the first relief valve 150 is not influenced at all since the port 153d communicates with the port 153e through the small diametrical section 154c of the spool 154 and the oil path 121 becomes to be a drain.

In this way, the second relief valve 15E operates to regulate the hydraulic pressure in the torque converter 12, while regulating the oil flow flowing into the oil cooler 200 and the lubricating circuit corresponding to the throttle pressure which is proportional to the engine torque. Consequently, when the engine torque is large that the hydraulic pressure required for lock-up is large, the oil flow into the oil cooler 200 and the lubricating circuit is reduced to raise the pressure in the torque converter 12, whereby the lock-up performance can be ensured. Conversely, when the engine torque is small that the hydraulic pressure required for lock-up is small, the oil flow into the oil cooler 200 and the lubricating circuit is increased. In this way, it is possible to attain the ensurement of the lock-up performance and the improvement of the cooling and lubricating capacity of the hydraulic oil.

Furthermore, since the drain port of the first relief valve 150 is connected to the second relief valve 15E, it is possible to secure the hydraulic oil for lubricating, even when the second relief valve 152 does not operate normally due to the alien substances etc. Thus, owing to the securing of the hydraulic oil for-lubricating, because there is no need to increase the discharge flow of the oil pump, it is possible to prevent the increasing of fuel consumption which would be caused by a burden on the oil pump.

Finally, It should be understood the present invention is not limited to the particular embodiments shown and described above, and various changes and modifications may be made without departing from the spirit and the scope of the appended claims.

What is claimed is:

1. A hydraulic circuit for a lock-up device, said lock-up device mechanically releases an output side of a hydraulic power transmission from an input side thereof and mechanically joins the input side to the output side, said lock-up device being connected to a cooling circuit for cooling hydraulic oil and a lubricating circuit, said hydraulic power transmission transmitting rotating force input therein to an output side thereof by means of said hydraulic oil, said hydraulic circuit comprising:

an oil path for supplying hydraulic pressure to said hydraulic power transmission; and a valve arranged in said oil path to regulate a flow of said hydraulic oil discharged toward one of said cooling circuit and said lubricating circuit, corresponding to a signal in relation to an engine torque.

2. A hydraulic circuit for a lock-up device, as claimed in claim 1, wherein said signal in relation to an engine torque is hydraulic pressure adjusted corresponding to a position of a throttle valve controlled by a driver.

3. A hydraulic circuit for a lock-up device, as claimed in claim 2, wherein said valve includes a spool and a spring, both of which are inserted into a valve hole, said valve hole having a first port to which said hydraulic pressure adjusted corresponding to the position of said throttle valve is input, a second port connected to said oil path for supplying the hydraulic pressure to said hydraulic power transmission, and a third port for discharging said hydraulic oil to one of said cooling circuit and said lubricating circuit;

wherein said hydraulic pressure adjusted corresponding to the position of said throttle valve and a force of said spring act on said spool in a first direction; and wherein said hydraulic pressure supplied to said hydraulic power transmission acts on said spool in a second direction opposite to said first direction such that a part of said hydraulic oil supplied to said hydraulic power transmission is discharged into one of said cooling circuit and said lubricating circuit.

4. A hydraulic circuit for a lock-up device, as claimed in claim 1, wherein said oil path for supplying hydraulic pressure to said hydraulic power transmission is provided with a relief valve which has a drain port for discharging said hydraulic oil in said hydraulic power transmission when said hydraulic pressure in said hydraulic power transmission is in excess of a predetermined value; and wherein said valve communicates said drain port of said relief valve with one of said cooling circuit and said lubricating circuit when said valve is in a position where said hydraulic oil is not discharged to one of said cooling circuit and said lubricating circuit.

5. A hydraulic circuit for a lock-up device, as claimed in claim 4, wherein said valve includes a spool and a spring, both of which are inserted into a valve hole, said valve hole having a first port to which said hydraulic pressure adjusted corresponding to said signal is input, a second port connected to an oil path connected to said drain port of said relief valve, a third port connected to said oil path for supplying said hydraulic pressure to said hydraulic power transmission and a fourth port for discharging said hydraulic oil to one of said cooling circuit and said lubricating circuit;

wherein said hydraulic pressure adjusted corresponding to said signal and a force of said spring act on said spool in a first direction; and wherein said hydraulic pressure supplied to said hydraulic power transmission acts on said spool in a second direction opposite to said first direction;

wherein, when said spool is moved in the first direction, said third port is communicated with said fourth port such that a part of the hydraulic oil supplied to said hydraulic power transmission is discharged into one of said cooling circuit and said lubricating circuit; and wherein, when said spool is moved in the second direction, said second port is communicated with said fourth port such that said hydraulic oil is discharged from said drain port of said relief valve into one of said cooling circuit and said lubricating circuit.

6. A hydraulic circuit for a lock-up device, as claimed in claim 5, wherein said signal in relation to an engine torque is hydraulic pressure adjusted corresponding to a position of a throttle valve controlled by a driver.

7. A hydraulic circuit for a lock-up device, as claimed in claim 2, wherein said oil path for supplying hydraulic pressure to said hydraulic power transmission is provided with a relief valve which has a drain port for discharging said hydraulic oil in said hydraulic power transmission when said hydraulic pressure in said hydraulic power transmission is in excess of a predetermined value; and wherein said valve communicates said drain port of said relief valve with one of said cooling circuit and said lubricating circuit when said valve is in a position where said hydraulic oil is not discharged to one of said cooling circuit and said lubricating circuit.

8. A hydraulic circuit for a lock-up device, as claimed in claim 7, wherein said valve includes a spool and a spring, both of which are inserted into a valve hole, said valve hole having a first port to which said hydraulic pressure adjusted corresponding to said signal is input, a second port connected to an oil path connected to said drain port of said relief valve, a third port connected to said oil path for supplying the hydraulic pressure to said hydraulic power transmission and a fourth port for discharging said hydraulic oil to one of said cooling circuit and said lubricating circuit;

wherein said hydraulic pressure adjusted corresponding to said signal and a force of said spring act on said spool in a first direction; and wherein said hydraulic pressure supplied to said hydraulic power transmission acts on said spool in a second direction opposite to said first direction;

wherein, when said spool is moved in the first direction, said third port is communicated with said fourth port such that a part of the hydraulic oil supplied to said hydraulic power transmission is discharged into one of said cooling circuit and said lubricating circuit; and wherein, when said spool is moved in the second direction, said second port is communicated with said forth port such that said hydraulic oil is discharged from said drain port of said relief valve into one of said cooling circuit and said lubricating circuit.

9. A hydraulic circuit for a lock-up device, as claimed in claim 8, wherein said signal in relation to an engine torque is hydraulic pressure adjusted corresponding to a position of a throttle valve controlled by a driver.

* * * * *